(12) United States Patent
Sonoda et al.

(10) Patent No.: US 10,663,946 B2
(45) Date of Patent: May 26, 2020

(54) MACHINE TOOL, PRODUCTION MANAGEMENT SYSTEM AND METHOD FOR ESTIMATING AND DETECTING TOOL LIFE

(71) Applicant: FANUC CORPORATION, Yamanashi (JP)

(72) Inventors: Naoto Sonoda, Yamanashi (JP); Yuusaku Oho, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 15 days.

(21) Appl. No.: 15/852,959

(22) Filed: Dec. 22, 2017

(65) Prior Publication Data

US 2018/0181106 A1    Jun. 28, 2018

(30) Foreign Application Priority Data

Dec. 28, 2016 (JP) .................................. 2016-255411

(51) Int. Cl.
G05B 19/4065    (2006.01)
B23Q 17/09    (2006.01)
B23Q 17/00    (2006.01)

(52) U.S. Cl.
CPC ....... G05B 19/4065 (2013.01); B23Q 17/008 (2013.01); B23Q 17/0961 (2013.01);
(Continued)

(58) Field of Classification Search
CPC ...... G05B 19/4065; G05B 2219/50185; G05B 2219/36347; B23Q 17/008; Y02P 90/86
(Continued)

(56) References Cited

U.S. PATENT DOCUMENTS 5,568,028 A    10/1996 Uchiyama et al.
5,571,957 A    11/1996 Tanaka
(Continued)

FOREIGN PATENT DOCUMENTS

CN    104166371 A    11/2014
CN    104768707 A    7/2015
(Continued)

OTHER PUBLICATIONS

An Office Action issued by the Chinese Patent Office dated Dec. 4, 2018, which corresponds to Chinese Patent Application No. 201711437487.X and is related to U.S. Appl. No. 15/852,959; with partial English language translation.

*Primary Examiner* — Thomas C Lee
*Assistant Examiner* — Charles Cai
(74) *Attorney, Agent, or Firm* — Studebaker & Brackett PC (57) ABSTRACT

To efficiently estimate and detect a tool life of a machine tool while lowering an occupation ratio in a data band of a communication line between a machine tool and an upper-level controller, a management apparatus or the like. A machine tool to be managed by a production management apparatus includes a motor for moving one of a workpiece to be machined and a tool for performing a machining operation, an amplifier for driving the motor, a servo controller for controlling the motor via the amplifier based on a notification of a predetermined machining operation, and an NC device for notifying the servo controller of the predetermined machining operation. The servo controller obtains servo data representing a load on the amplifier, performs a first processing for compressing the servo data, and transmits the compressed data to the NC device.

6 Claims, 4 Drawing Sheets

(52) U.S. Cl.
CPC ............... *B23Q 17/0995* (2013.01); *G05B 2219/36347* (2013.01); *G05B 2219/50185* (2013.01); *Y02P 90/86* (2015.11)

(58) Field of Classification Search
USPC .......................................................... 700/175
See application file for complete search history.

(56) References Cited

U.S. PATENT DOCUMENTS

| | | | |
|---|---|---|---|
| 5,602,347 A | 2/1997 | Matsubara et al. | |
| 6,501,997 B1 * | 12/2002 | Kakino | G05B 19/40937 318/568.1 |
| 2003/0028387 A1 * | 2/2003 | Kilbank | H03M 7/30 704/500 |
| 2011/0119716 A1 * | 5/2011 | Coleman, Sr. | H04N 7/181 725/62 |
| 2014/0201571 A1 * | 7/2014 | Hosek | G06F 11/2257 714/26 |
| 2018/0052442 A1 * | 2/2018 | Cheng | G05B 19/4065 |
| 2018/0107201 A1 * | 4/2018 | Cu-Unjieng | G05B 23/0208 |

FOREIGN PATENT DOCUMENTS

| | | |
|---|---|---|
| CN | 104808585 A | 7/2015 |
| CN | 105033763 A | 11/2015 |
| CN | 106249697 A | 12/2016 |
| JP | S57-158538 A | 9/1982 |
| JP | S59-175942 A | 10/1984 |
| JP | H03-132899 A | 6/1991 |
| JP | H07-051998 A | 2/1995 |
| JP | 2002-196807 A | 7/2002 |
| JP | 2004-501777 A | 1/2004 |
| JP | 2004-130407 A | 4/2004 |
| JP | 2010-149206 A | 7/2010 |

* cited by examiner

MACHINE TOOL, PRODUCTION MANAGEMENT SYSTEM AND METHOD FOR ESTIMATING AND DETECTING TOOL LIFE

This application is based on and claims the benefit of priority from Japanese Patent Application No. 2016-255411, filed on 28 Dec. 2016, the content of which is incorporated herein by reference.

BACKGROUND OF THE INVENTION

Field of the Invention

The present invention relates to a production management system for estimating and detecting a tool life of a machine tool, and a method for estimating and detecting the tool life. In particular, the present invention relates to a production management system and a method for sampling information on torque during a predetermined machining, and estimating or detecting a tool life based on a change in such obtained data.

Related Art

In a conventional machine tool, it is important to estimate a tool life according to wear or the like, or detect the tool life. That is, if a tool wears and the tool is broken during machining, there is a risk that a workpiece to be machined may be damaged. Accordingly, before a tool is broken due to the tool life thereof and thus a defective workpiece is produced, such a tool needs to be replaced in order to improve an operating rate of a machine tool.

There are various prior art documents each relating to a method for determining such a tool life. For example, Patent Document 1, which is described below, discloses a technique for estimating a tool life according to a change amount in sampled data with respect to a motor for driving a tool or a workpiece, based on machining conditions.

Further, Patent Document 2, which is described below, discloses a technique for estimating a tool life according to an integrated value of torque of a motor of a machine tool. Furthermore, Patent Document 3, which is described below, discloses a technique for estimating a lifetime of a machine tool according to dispersion of sampling data with respect to a motor of the machine tool.

Patent Document 1: Japanese Unexamined Patent Application, Publication No. 2010-149206
Patent Document 2: Japanese Unexamined Patent Application, Publication No. H07-051998
Patent Document 3: Japanese Unexamined Patent Application, Publication No. H03-132899

SUMMARY OF THE INVENTION

Figure 3:
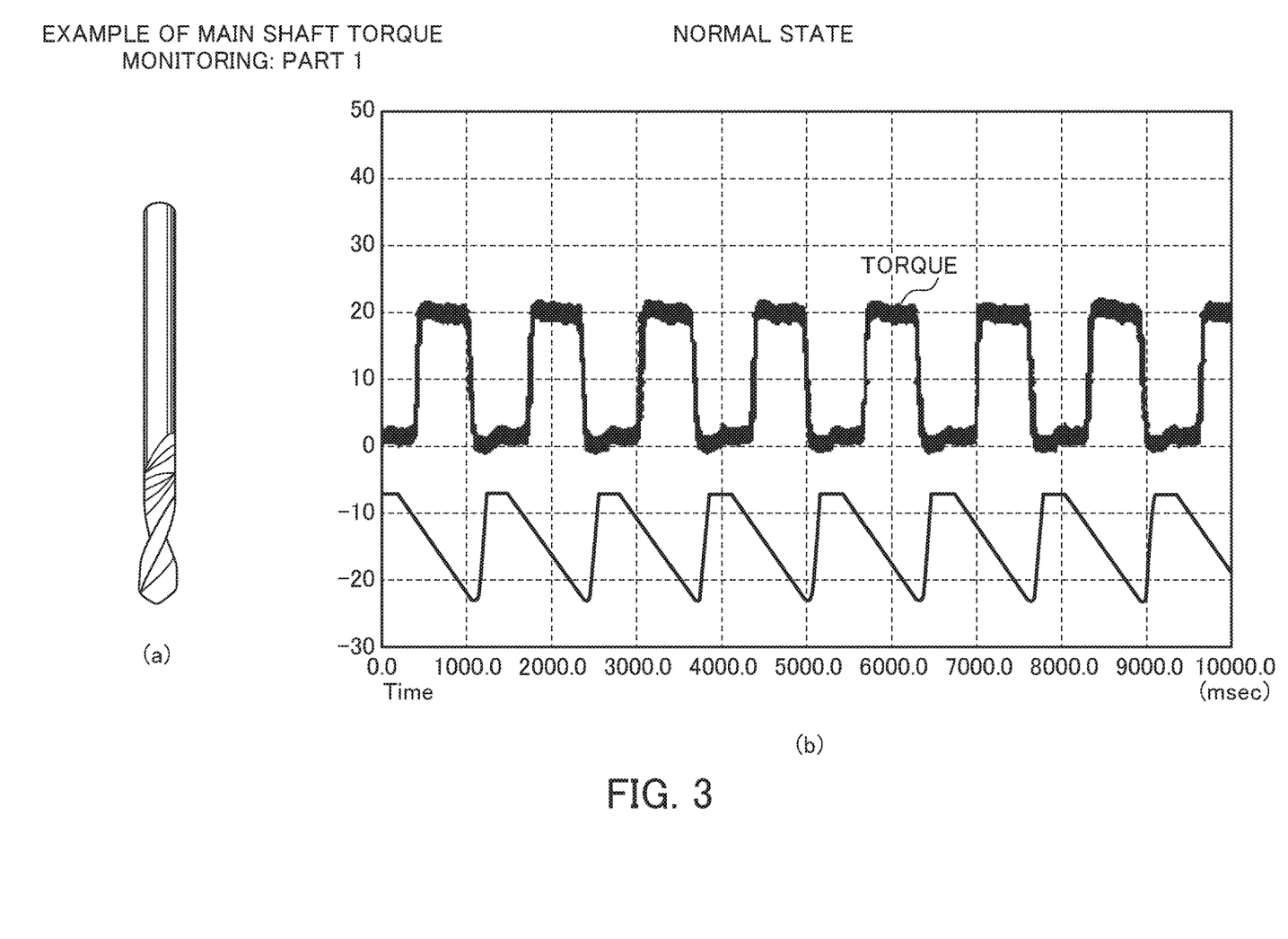
FIG. 3 is an example of torque monitoring in the case of a tool in a normal state.
Figure 4:
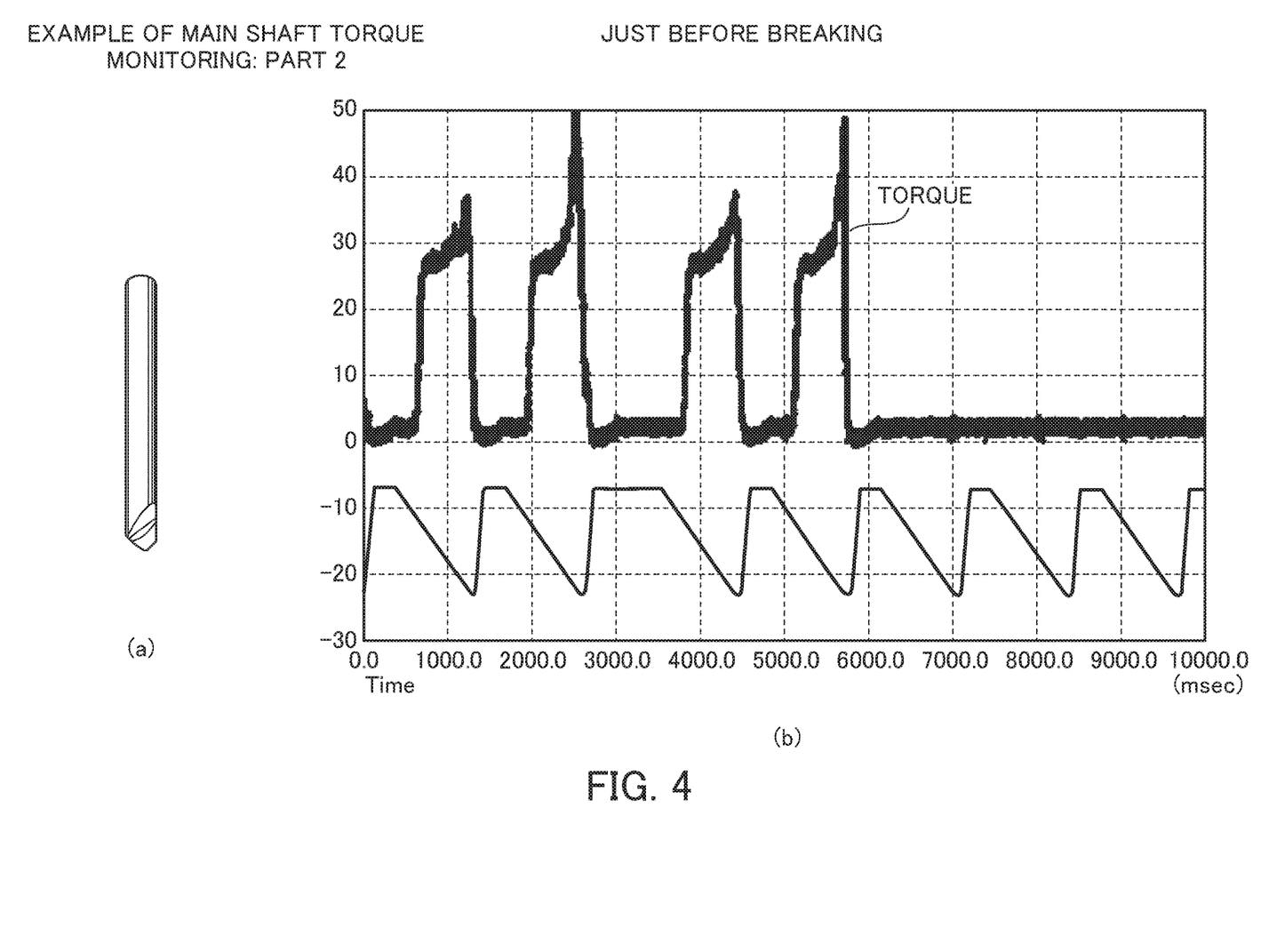
FIG. 4 is an example of torque monitoring in the case of a tool in a state just before breaking due to wear.

Each of FIG. 3 and FIG. 4 is an explanatory diagram illustrating a change in torque (current value of a motor) due to wear. Each of FIG. 3 and FIG. 4 shows an example where main shaft torque is monitored. FIG. 3(a) is a diagram illustrating a tool in a normal state. FIG. 4(a) is a diagram illustrating a tool in a state just before breaking due to wear. FIG. 3(b) is a graph indicating torque (upper graph) and a position (lower graph) of a motor for driving the tool illustrated in FIG. 3(a). FIG. 4(b) is a graph indicating torque (upper graph) and a position (lower graph) of a motor for driving the tool illustrated in FIG. 4(a). The horizontal axis in each graph represents time, and the vertical axis represents torque (upper graph: motor current value) and a position of a motor (lower graph). The comparison between the graph of FIG. 3(b) and the graph of FIG. 4(b) reveals that spikes and overshoots have occurred in the graph of torque of FIG. 4(b). Thus, it is understood that the comparison with a graph in a normal state enables to detect abnormality.

Various techniques for estimating or detecting a tool life according to wear of a tool or the like by use of servo data such as on torque of a motor or the like are known, as described above. Any of the patent documents described above discloses a technique for obtaining data on a motor for driving the tool or on a motor for driving a workpiece to be machined by the tool, and determining the tool life based on the data. However, such a conventional technique requires sampling of an enormous amount of data for estimation of the lifetime with high accuracy. The transmission of the data to various upper-level controllers for determining the lifetime may largely occupy a data band in the communication line thereof with a high possibility. In particular, processing of continuous monitoring of the lifetime may occupy a much larger part of the data band because continuous sending of a large amount of data is required. The present invention has been made in consideration of such problems. The object of the present invention is to efficiently estimate and detect a tool life of a machine tool, while lowering an occupation ratio in a data band of a communication line between a machine tool and an upper-level controller, a management apparatus or the like.

When a machining operation is performed repeatedly and thereby a tool wears, a load on a main shaft or a feed shaft increases during machining. The inventors of the present invention have independently found that the load is enabled to be obtained as a value obtained by squaring and integrating values of torque (motor current) of a motor of the main shaft or the feed shaft. The inventors have found, in particular, that the value obtained by squaring and integrating the values of torque is unrelated to signs and the data amount is enabled to be compressed, unlike the value obtained by integrating the values of torque as they are. In order to grasp a subtle change in a load, data sampling at high speed is required.

In order to detect a tool life by use of such features, the inventors of the present invention have independently developed the process as below. A square integration value is calculated from the values of torque (motor current) in the case of a new tool operating normally, and recorded. Every time machining is performed, a square integration value at the time of machining is compared with the square integration value in the normal state. In the mechanism proposed in the present invention, the value obtained by integrating squared values of torque at the normal state is stored as an initial value, and a vibration during machining is automatically measured and compared with the stored initial value. The state of machining by the tool is grasped based on the result, and a tool life is enabled to be estimated according to the state. Tool replacement or the like is enabled to be performed smoothly based on such estimation. Accordingly, generation of defective parts is considered to be suppressed. In order to perform such estimation or detection of a tool life, the following technical elements may be used.

(a) Means for performing notification of the start and the end of data collection based on a predetermined tool to be used for a predetermined machining and machining conditions for a predetermined machining. In an example, the means, which corresponds to an NC device 202 described below, gives an instruction for machining, and thus is considered capable of grasping the start and the end of the data collection. It is noted that other device for giving an instruction for machining may perform notification of the start and the end.

(b) Means for high-speed sampling torque (current) to perform a squaring and integrating processing or other processing at predetermined time intervals. In an example, a servo controller 204, which outputs a current value and will be described below, is appropriate as the means for performing a squaring and integrating processing or other processing. Alternatively, other device for giving an instruction with respect to torque (current) may be used.

(c) Means for transferring (transmitting) the data obtained by squaring and integrating to an upper-level controller (such as a production management apparatus). In an example, the servo controller 204 may be configured to perform the squaring and integrating processing and transfer the resultant value to the upper-level NC device 202.

(d) Means for further performing the squaring and integrating processing or other processing to the transferred (transmitted) data. The means may perform the squaring and integrating processing or other processing while further continuing to perform machining to a workpiece. In an example, the NC device 202, which will be described below, may further perform the squaring and integrating processing for data compression.

(e) Means for further adding machining conditions or the like to the data subjected to the processing by the above means (d), and storing the data for each machining condition in a predetermined memory. In an example, the NC device 202 may perform addition of machining conditions for storage for each condition. The storage location may be an internal memory of the NC device 202 or may be an external memory.

(f) Means for estimating and/or detecting a tool life based on a change in the data stored for each machining condition by the above means (e). In an example, the NC device 202 may detect a change, and estimate and detect a tool life based on the detected result. Alternatively, an upper-level production management apparatus may detect a change, and estimate and detect a tool life. These technical elements are adopted preferably, and specific aspects will be described in detail in the embodiments described below. Specific means adopted by the present invention are as follows:

(1) A machine tool according to the present invention, which is a machine tool (for example, a machine tool 200, which is described below) managed by a production management apparatus (for example, a production management apparatus 100, which is described below), includes a motor (for example, a motor 208, which is described below) for moving one of a workpiece to be machined and a tool for performing a machining operation, an amplifier (for example, an amplifier 206, which is described below) for driving the motor, a servo controller (for example, a servo controller 204, which is described below) for controlling the motor via the amplifier based on a notification of a predetermined machining operation, and an NC device (for example, an NC device 202, which is described below) for notifying the servo controller of the predetermined machining operation, wherein the servo controller obtains servo data representing a load on the amplifier, performs a first processing for compressing the servo data, and transmits the compressed data to the NC device.

(2) In the machine tool according to (1), the NC device may perform a second processing for compressing the transmitted data, store the compressed data in predetermined storage means, monitor a change in the stored data, and estimate and/or detect a tool life based on a predetermined determination criterion.

(3) In the machine tool according to (2), the NC device may perform a squaring and integrating processing to the data as the second processing for compressing the data.

(4) In the machine tool according to any one of (1) to (3), the servo controller may perform a squaring and integrating processing to the servo data at a predetermined time as the first processing for compressing the servo data.

(5) In the machine tool according to any one of (1) to (4), the servo data may be a current value of the motor, and the current value represents torque of the motor.

(6) In the machine tool according to (1), the NC device, instead of the servo controller, may perform the first processing to the servo data, and the servo controller may transmit the servo data without any change to the NC device.

(7) In the machine tool according to (2), after performing the second processing, the NC device may add machining conditions or the like to the data subjected to the second processing, and may store the data for each machining condition.

(8) In the machine tool according to (7), the NC device may monitor a change in the data stored for each machining condition, and may issue a warning to a user when values of consecutive n pieces of the data exceed a predetermined first threshold value, wherein the n is a natural number.

(9) In the machine tool according to (7), the NC device may monitor a change in the data stored for each machining condition, and may issue a warning to a predetermined upper-level management apparatus or management section when values of consecutive m pieces of the data exceed a predetermined second threshold value, wherein the m is a natural number.

(10) A production management system (for example, a production management system 10, which is described below) includes the machine tool according to (1) and the production management apparatus for managing the machine tool, wherein the NC device performs a second processing for compressing the transmitted data, and transmits the compressed data to the production management apparatus, and wherein the production management apparatus stores the transmitted data in a predetermined memory, monitors a change in the stored data, and estimates and/or detects a tool life based on a predetermined determination criterion.

(11) In the machine tool according to (10), the production management apparatus may monitor a change in the data stored for each machining condition, and may issue a warning to a user when values of consecutive n pieces of the data exceed a predetermined first threshold value, wherein the n is a natural number.

(12) In the machine tool according to (10), the production management apparatus may monitor a change in the data stored for each machining condition, and may issue a warning to a predetermined upper-level management apparatus or management section when values of consecutive m pieces of the data exceed a predetermined second threshold value, wherein the m is a natural number.

(13) A method for estimating and detecting a tool life of a machine tool for machining a predetermined workpiece according to the present invention includes the steps of torque obtaining for obtaining servo data representing torque of a motor for moving one of the workpiece and the tool, first compressing as a first processing for compressing the servo data, second compressing as a second processing for further compressing the data compressed in the step of first compressing, storing for storing the data compressed in the step of second compressing in predetermined storage means, and estimating and detecting for performing estimation and/or detection of a tool life based on a predetermined determination criterion by monitoring a change in the stored data.

According to the present invention, since the obtained servo data is compressed, the servo data of the motor is easily enabled to be transferred to a predetermined device, even in the case of only low-speed communication being available. Accordingly, usage of the compressed servo data efficiently enables to estimate and/or detect a tool life.

DETAILED DESCRIPTION OF THE INVENTION

One preferable embodiment according to the present invention is described below with reference to the drawings.

1. Principle

In the present embodiment, a tool life is generally estimated by the process as below. First, a square integration value of values of torque at a normal operation is stored as an initial value. Next, the state of machining is grasped by automatically measuring vibration during machining. Then, a tool life is estimated from the grasped machining state. A tool life is estimated through such a process in order to suppress defective parts from being produced. In particular, in the present embodiment, a value of torque (current value) is compressed through squaring and integrating. Accordingly, the method enables to reduce the amount of data as compared with the method of transmitting a value of torque without any change to an upper-level controller and management apparatus.

Figure 1:
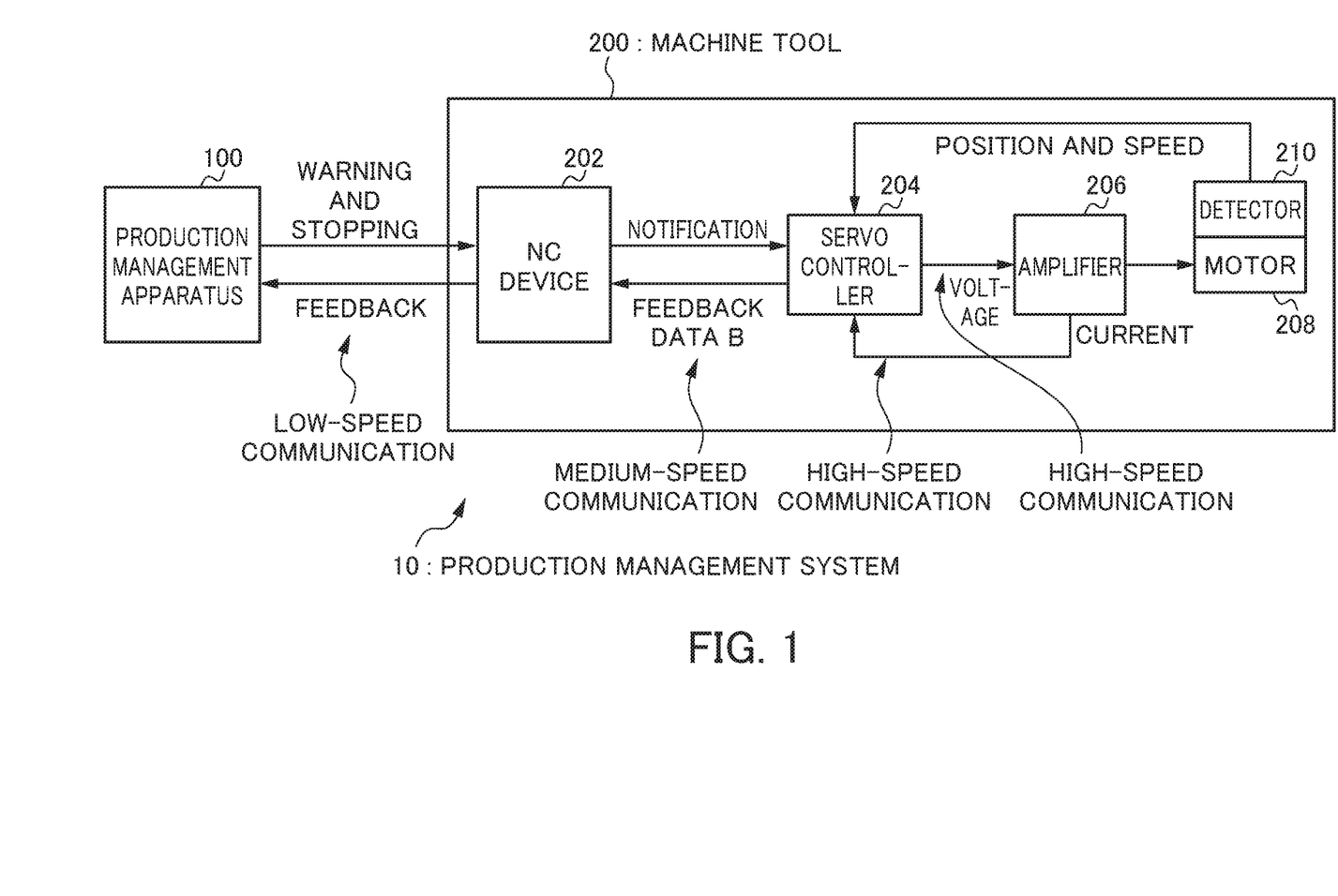
FIG. 1 is an overall configuration diagram of a production management system according to the present embodiment.

2. Configurations of Production Management Apparatus and Machine Tool According to Present Embodiment FIG. 1 is an overall configuration diagram of a production management system 10 including a production management apparatus 100 according to the present embodiment and a machine tool 200 managed by the production management apparatus 100. Although only one unit of the machine tool 200 is illustrated in the production management system 10 shown in FIG. 1, a plurality of the machine tools 200 may be connected to the production management apparatus 100. As shown in FIG. 1, the machine tool 200 in FIG. 1 includes an NC device 202, a servo controller 204, an amplifier 206, a motor 208, and a detector 210 for detecting a rotation of the motor.

As shown in FIG. 1, the production management apparatus 100 manages the machine tool 200. In other words, the production management apparatus 100 monitors and manages the operation of the machine tool 200. Specifically, the production management apparatus 100 monitors the operation of the machine tool by receiving a feedback signal from the machine tool 200, and thereby issues a warning to the machine tool 200, gives an instruction for stop or performs other operation based on the operation of the machine tool. It is noted that the feedback signal is generally transmitted through low-speed communication.

The NC device 202 notifies, using a program or a signal, the servo controller 204 to perform a specific machining operation, that is, to perform specific machining with a specific tool. The notification is performed through medium-speed communication inside the machine tool 200. The medium-speed communication refers to communication having communication speed not lower than the above low-speed communication, which is communication having communication speed at least equal to or faster than the above low-speed communication.

Based on the notification from the NC device 202, the servo controller 204 issues a voltage command to the amplifier 206 to drive the motor 208. At this time, the servo controller 204 receives a feedback signal of current from the amplifier 206. The servo controller 204 further receives a feedback signal of the position and speed of the motor 208 output by the detector 210 attached to the motor 208, and performs a so-called feedback control by controlling the motor 208 to adjust the position and speed according to the "notification" described above.

The servo controller 204 samples the feedback signals of current value at the timing of receiving the notification from the NC device 202, so as to obtain data A. Since the current value of the motor 208 represents the torque of the motor, it can be said that the data A correspond to the servo data representing the torque. The operation to obtain the data A corresponds to a preferable example of the step of torque obtaining in the scope of the claims. The servo controller 204 further processes the data A (first processing) to obtain data B, and transfers (feeds back) the data B to the NC device 202 (refer to FIG. 1).

Servo Data

The current value of the motor 208 corresponds to a preferable example of the servo data in the scope of the claims. Although the current value is described as an example of the servo data in the present embodiment, other servo data may be used as long as the parameter thereof express torque or a load of the motor 208.

First Processing

The processing to the data A refers to, for example, a squaring and integrating processing or the like. The processing to the data A corresponds to a preferable example of the first processing in the scope of claims, and corresponds to one type of compression processing. In the present embodiment, although the squaring and integrating processing is described as one example of the compression processing, other compression processing may be used. Further, the processing to the data A corresponds to a preferable example of the step of first compressing in the scope of claims. In order to perform more precise estimation and detection, sampling at high speed is preferable.

The voltage command from the servo controller 204 to the amplifier 206 is transmitted through high-speed communication. The high-speed signal may be transmitted as an analog signal which transmits a voltage without any change, or may be transmitted as a digital signal. In either case, the high-speed communication refers to the communication where a signal transmission speed is faster than the above medium-speed communication. The feedback signal of current received from the amplifier 206 is also transmitted through similar high-speed communication (refer to FIG. 1). On the other hand, transferring (feedback) from the servo controller 204 to the NC device 202 is performed through medium-speed communication.

The amplifier 206 power-amplifies the voltage command (voltage signal) output by the servo controller 204 so as to drive the motor 208. The current value in the case of actually driving the motor 208 is transmitted to the servo controller 204. Such transmission is performed through high-speed communication. A circuit in which the voltage representing the current value is fed back is available. The current value may be converted into a digital signal by a sensor so as to be transmitted by an optical fiber or the like. In order that the motor 208 is controlled promptly, the current value is transmitted at high speed, which is referred to as high speed communication.

The motor 208 is driven by the amplifier 206 to move a workpiece and a tool. In other words, the motor 208 serves as the motor 208 to move one of a workpiece to be machined and a tool for performing a machining operation, which corresponds to a preferable example of the motor in the scope of claims.

The NC device 202 processes the data B (second processing: squaring and integrating processing or the like) transferred (fed back) through medium-speed communication before the previous notification is completed, and adds machining conditions (tool and machining) to the performed machining operation to construct data C. The NC device 202 stores the data C in a memory of the NC device 202. The memory of the NC device 202 may be a so-called built-in memory, or may be a memory disposed externally. The processing of storing the data C obtained after being compressed by the NC device 202 in the memory corresponds to a preferable example of the storing step in the scope of claims.

Second Processing

A characteristic feature in the present embodiment is that the NC device performs the second processing. Thereby, the amount of data is enabled to be further reduced. The second processing corresponds to a preferable example of the second processing in the scope of claims, and is one type of compression operation. Herein, other type of compression operation may serve as the second processing of the squaring and integrating processing. The second processing corresponds to a preferable example of the second compressing step in the scope of claims. The NC device 202 monitors a change in the data C according to the above machining conditions in the data C by referring to the above memory, and estimates and/or detects a tool life according to predetermined determination conditions. The processing of estimating and/or detecting a tool life corresponds to a preferable example of the estimating and detecting step in the scope of claims.

Estimation and Detection

The estimation in the present specification refers to estimating of a future tool life, and the detection refers to detection of whether or not the tool has reached its end of life. In the case of a tool having reached its end of life, in general, the tool is subjected to replacement. In the case where a tool is determined to closely reach its end of life as a result of estimating the tool life, a tool for replacement may be prepared (may be ordered for preparation).

The NC device 202 notifies (performs transmission to), through low-speed communication, the upper-level production management apparatus 100 of the above data C to which the machining conditions are attached. The notification is performed through low-speed communication. That is, the communication between the machine tool 200 and the production management apparatus 100 is performed through low-speed communication.

The production management apparatus 100 stores the data C obtained through notification (fed back) in the storage of the production management apparatus 100. The storage shall preferably have a large capacity. The production management apparatus 100 estimates or detects a tool life in accordance with a change in the data C according to the machining conditions based on a predetermined determination conditions. Then, based on the estimation result and the detection result, the production management apparatus 100 may issue a warning to a user, or may notify the NC device to stop the operation of the machine tool 200 or other operation.

Determination Conditions

The production management apparatus 100 monitors a change in the data C for each machining condition having been transmitted (stored), and issues a warning to a user in the case where the values of consecutive n pieces of the data C exceed a predetermined first threshold value. The above-described n is a natural number. Although a warning is issued to a user in the present specification, a warning may be issued to any of various management sections, management apparatuses, and machine tools. The production management apparatus 100 further monitors a change in the data C for each machining condition having been transmitted (stored), and issues a warning to a predetermined upper-level management apparatus or management section in the case where the values of consecutive m pieces of the data exceed a predetermined second threshold value. The above-described m is a natural number. The both n and m may be any of natural numbers, and any threshold values may be adopted as the first threshold value and the second threshold value.

In the present embodiment, the processing in two steps (two types of processing) is described above. Any number of such determination criteria may be prepared. It is preferable that n, m, the first threshold value, and the second threshold value are set in advance, but they may be dynamically changed. In the present embodiment, the production management apparatus 100 performs warring and stopping. Alternatively, the NC device 202 of the machine tool may perform the above-described operations of the production management apparatus 100 to estimate and detect the tool life. Similarly, the NC device 202 may issue a warning or the like based on such estimation result and detection result. The operation may be performed based on determination criteria by use of n, m, the first threshold value, and the second threshold value, as described above.

Figure 2:
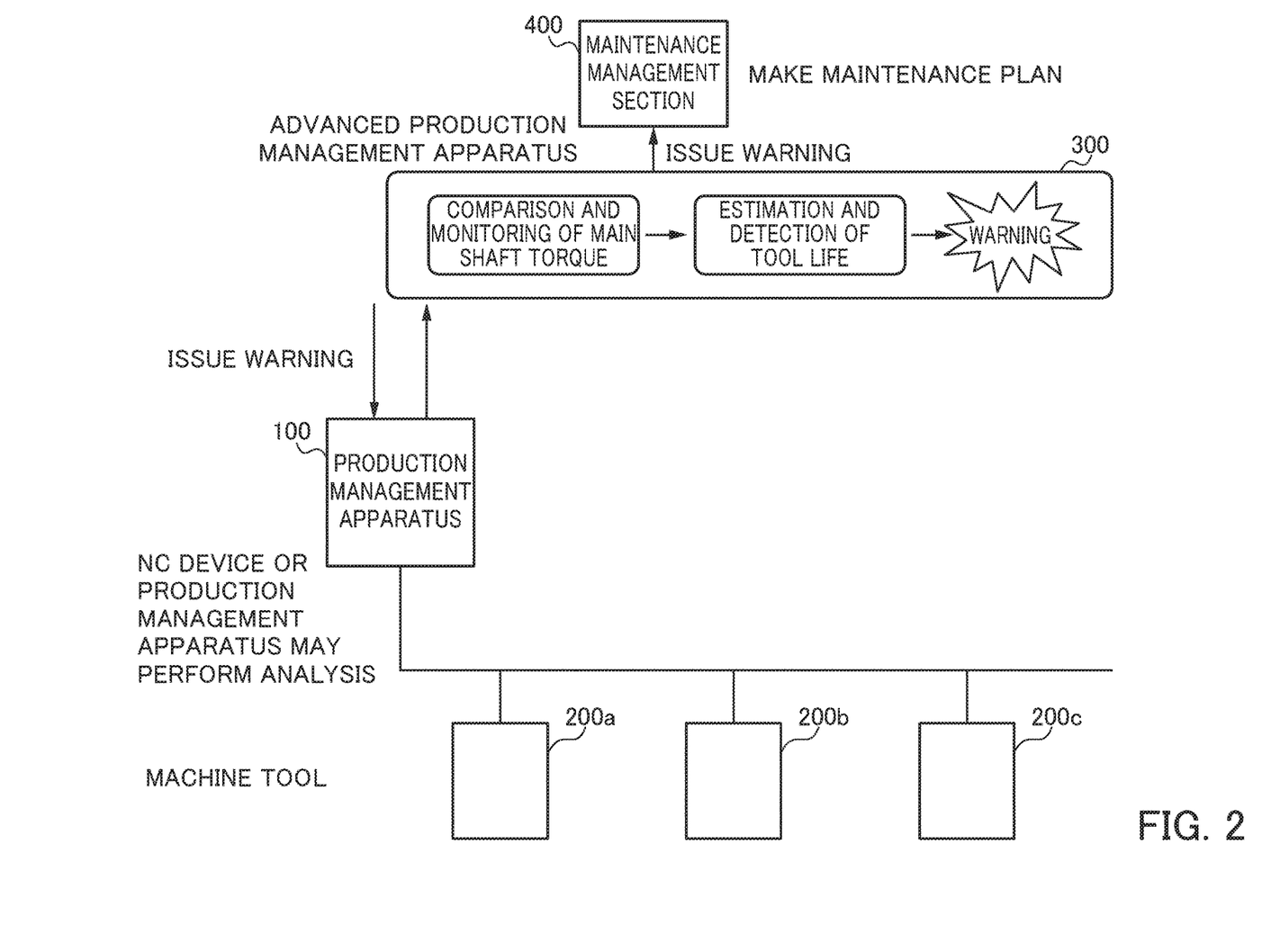
FIG. 2 is an overall explanatory diagram illustrating a configuration of an overall production system according to the present embodiment.

In the present embodiment, the production management apparatus 100 performs warning or stopping. Alternatively, the production management apparatus 100 may transmit such estimation result and detection result to an upper-level advanced production management apparatus, and the upper-level advanced production management apparatus may perform warning or the like. FIG. 2 shows an overall explanatory diagram of a system including such an upper-level advanced production management apparatus.

3. Overall Explanatory Diagram

FIG. 2 shows an overall explanatory diagram illustrating a configuration of an overall production system including an advanced production management apparatus 300 positioned in a higher level than the production management apparatus 100. It is considered that, in many cases, a configuration similar to that shown in FIG. 2 is seen as a configuration of a production system in an actual factory or the like. In the example shown in FIG. 2, a plurality of machine tools 200a, 200b and 200c are connected to the production management apparatus 100. They may be connected by Local Area Network (LAN) such as EtherNet (registered trademark) or the like. In such a case, LAN is an example of low-speed communication. Alternatively, communication through wireless LAN or a mobile phone line may be used. These are also examples of low-speed communication.

In each machine tool 200, the NC device 202 and the servo controller 204 are preferably connected by, for example, an internal bus of a computer (for example, PCI-Express or the like), or alternatively, may be connected by Universal Serial Bus (USB) or the like. These internal buses and the like are examples of medium-speed communication. The communication between the servo controller 204 and the amplifier may be of analog communication, or may be of high-speed optical fiber communication. These correspond to examples of high-speed communication.

In FIG. 2, the advanced production management apparatus 300 as an upper-level device is connected to the production management apparatus 100. In the present embodiment, as described above, analysis of a tool life, that is, lifetime estimation and lifetime detection may be performed by the NC device 202 of each machine tool 200, or by the production management apparatus 100. Issuing a warning, stopping the operation of a machine tool or other operation based on such analysis result, that is, the estimation result of a lifetime and the detection result of a lifetime may be performed by the production management apparatus 100, or alternatively may be performed by an upper-level device (for example, the advanced production management apparatus 300 in FIG. 2).

In the example shown in FIG. 2, the upper-level advanced production management apparatus 300 performs lifetime estimation and detection operation as well. In this example, the upper-level advanced production management apparatus 300 issues a warning or the like in addition to estimation and detection of a tool life, based on such estimation result and detection result. In an example, the upper-level advanced production management apparatus 300 performs comparison and monitoring with respect to, for example, main shaft torque, to estimate and detect a tool life. The upper-level advanced production management apparatus 300 further issues a warning or the like based on the estimation result and the detection result. In the example of FIG. 2, the advanced production management apparatus 300 as an example issues a warning to a maintenance management section 400 which makes a maintenance plan for a factory. Based on the warning, the maintenance management section 400 is capable of performing treatment such as preparation of a spare tool and replacement of a tool.

Reduction in Data Amount

As described above, in many cases and in general, communication closer to the motor 208 is promptly controlled through high-speed communication, but communication closer to a management section is performed through relatively-low-speed communication because a data band is less required. In such a case, it is not preferable that the data (servo data) of the motor 208 without any change are directly transmitted to an upper-level management apparatus or management section, from the viewpoint of the transmission data amount. The present embodiment achieves to provide more efficient management, by performing the first processing and the second processing to reduce data amount. The present embodiment further achieves to reduce a capacity of an external storage, and reduce processing load of an external management apparatus or the like, with the reduction of data amount, thereby enabling to efficiently estimate and detect a tool life.

4. Modifications (1) In the above-described embodiment, data are compressed by the first processing and the second processing. Alternatively, only one of them may be performed. If data are sufficiently reduced in amount only by one of them, effects can be exerted. Conversely, more types of processing such as a third processing may be added to the first processing and the second processing.

(2) in the above-described embodiment, the current value is used as servo data in order to monitor the torque of the motor. Alternative other parameters may be used.

(3) In the above-described embodiment, the squaring and integrating processing is taken as an example of the compression processing. Alternatively, other compression processing may be used.

Although the embodiments according to the present invention have been described in detail as above, the above-described embodiments merely indicate specific examples as embodiments according to the present invention. The technical scope of the present invention is not limited to the above-described embodiments. The present invention is enabled to be variously modified without departing from the spirit thereof, and these modifications are also included in the technical scope of the present invention.

EXPLANATION OF REFERENCE NUMERALS

10 Production Management System
100 Production Management Apparatus
200, 200a, 200c Machine Tool
202 NC Device
204 Servo Controller
206 Amplifier
208 Motor
210 Detector
300 Advanced Production Management Apparatus
400 Maintenance Management Section

What is claimed is:

1. A production management system comprising:
a machine tool; and
a production management apparatus for managing the machine tool, wherein the machine tool comprises:
a motor for moving one of a workpiece to be machined and a tool for performing a machining operation;
an amplifier for driving the motor;
a servo controller for controlling the motor via the amplifier based on a notification of a predetermined machining operation; and
a numerical controlling (NC) device for notifying the servo controller of the predetermined machining operation, wherein
the servo controller obtains servo data representing a load on the amplifier at high speed through high-speed communication, performs a first processing for compressing the servo data, and transmits the compressed servo data subjected to the first processing to the NC device through medium-speed communication,
the NC device performs a second processing for compressing the received compressed servo data, and transmits the compressed data subjected to the second processing to the production management apparatus through low-speed communication,
the production management apparatus stores the transmitted data in a predetermined memory, monitors a change in the stored data, and performs at least one of estimation and detection of a tool life based on a predetermined determination criterion, after performing the second processing, the NC device adds machining conditions to the compressed data subjected to the second processing, and the production management apparatus stores the transmitted data for each of the machining conditions.

2. The production management system according to claim 1, wherein the NC device performs a squaring and integrating processing to the data as the second processing for compressing the received compressed servo data.

3. The production management system according to claim 1, wherein the servo controller performs a squaring and integrating processing to the servo data at a predetermined time as the first processing for compressing the servo data.

4. The production management system according to claim 1, wherein the servo data is a current value of the motor, and the current value represents torque of the motor.

5. The production management system according to claim 1, wherein the production management apparatus monitors a change in the data stored for each machining condition, and issues a warning to a user when values of consecutive n pieces of the data exceed a predetermined first threshold value, wherein the n is a natural number.

6. The production management system according to claim 1, wherein the production management apparatus monitors a change in the data stored for each machining condition, and issues a warning to a predetermined upper-level management apparatus or management section when values of consecutive m pieces of the data exceed a predetermined second threshold value, wherein the m is a natural number.

* * * * *